United States Patent
Chen et al.

(10) Patent No.: US 10,374,373 B1
(45) Date of Patent: Aug. 6, 2019

(54) CONNECTOR FIXING STRUCTURE

(71) Applicant: Chi-Wei Lo, Taipei (TW)

(72) Inventors: Chih-Hung Chen, Taipei (TW);
Tung-Lou Lin, Taipei (TW); Jing-Qing Chan, Taipei (TW)

(73) Assignee: Chi-Wei Lo, Taipei (TW)

( * ) Notice: Subject to any disclaimer, the term of this patent is extended or adjusted under 35 U.S.C. 154(b) by 0 days.

(21) Appl. No.: 15/928,048

(22) Filed: Mar. 21, 2018

(51) Int. Cl.
| | |
|---|---|
| *H01R 31/06* | (2006.01) |
| *H01R 13/639* | (2006.01) |
| *G02B 6/42* | (2006.01) |
| *H01R 13/631* | (2006.01) |
| *H01R 13/62* | (2006.01) |

(52) U.S. Cl.
CPC ........... *H01R 31/06* (2013.01); *G02B 6/4274* (2013.01); *H01R 13/6205* (2013.01); *H01R 13/631* (2013.01); *H01R 13/639* (2013.01)

(58) Field of Classification Search
CPC ............................ H01R 31/06; H01R 13/6205
See application file for complete search history.

(56) References Cited

U.S. PATENT DOCUMENTS

| | | | | |
|---|---|---|---|---|
| 3,725,850 A * | 4/1973 | Izumi | ................... | F21V 19/0005 439/359 |
| 4,637,671 A * | 1/1987 | Johnson | ................. | H01R 33/97 439/227 |
| 6,371,790 B1 * | 4/2002 | Huang | ................ | H01R 13/6453 439/378 |
| 6,506,078 B1 * | 1/2003 | Mori | ................... | H01R 13/4367 439/108 |
| 6,875,027 B2 * | 4/2005 | Ye | ......................... | H01R 13/627 439/345 |
| 7,214,086 B1 * | 5/2007 | Hsieh | ..................... | H01R 13/53 439/352 |
| 7,252,549 B2 * | 8/2007 | Nishio | .................... | H01R 13/64 439/607.55 |
| 7,429,197 B2 * | 9/2008 | Weis | ........................ | H01R 9/03 439/374 |
| 8,419,479 B2 * | 4/2013 | Vroom | ................. | H01R 13/512 361/679.45 |
| 8,517,756 B2 * | 8/2013 | Song | .................. | H01R 13/6271 439/357 |
| 8,870,601 B2 * | 10/2014 | Lee | ........................ | H01R 31/06 439/131 |

(Continued)

*Primary Examiner* — Tho D Ta
(74) *Attorney, Agent, or Firm* — Leong C. Lei

(57) ABSTRACT

A connector fixing structure having a transmission plug and an adapter plug; wherein the transmission plug is respectively set with a first magnetic element, a guide slot, and a positioning groove; and the adapter plug is respectively set with a signal jack, a second magnetic element, a protruding block, and a resilient piece at the positions of the connection section. The first plug of small size set in the transmission plug can electrically connected with the signal jack. And, the first magnetic element and the second magnetic element can be mutually adsorbed, the protruding block can be mutually combined, and the positioning groove can be mutually engaged with the resilient piece. Therefore, the multi-point stable combination between the transmission plug and the adapter plug is achieved. It also enables the first plug to perform the connection ability after the second plug penetrates through the fitting hole of smaller size.

17 Claims, 4 Drawing Sheets

(56) References Cited

U.S. PATENT DOCUMENTS

| | | | |
|---|---|---|---|
| 9,991,657 B2* | 6/2018 | Powers | H01R 31/06 |
| 2002/0137382 A1* | 9/2002 | Shirakura | H01R 31/06 |
| | | | 439/218 |
| 2007/0037454 A1* | 2/2007 | Bushby | H01R 13/6397 |
| | | | 439/680 |
| 2015/0288110 A1* | 10/2015 | Taniguchi | H01R 13/46 |
| | | | 439/620.22 |

* cited by examiner

CONNECTOR FIXING STRUCTURE

(a) TECHNICAL FIELD OF THE INVENTION

The present invention relates to a connector fixing structure, and especially relates to a connector fixing structure having a transmission plug and an adapter plug; wherein the transmission plug is respectively set with a first magnetic element, a guide slot, and a positioning groove; and the adapter plug is respectively set with a signal jack, a second magnetic element, a protruding block, and a resilient piece at the positions of the connection section. The first plug of small size set in the transmission plug can mutually insertedly and electrically connected with the signal jack. And, the first magnetic element and the second magnetic element can be mutually adsorbed, the protruding block can be combined with the guide slot, and the positioning groove can be mutually engaged with the resilient piece. Therefore, the multi-point stable combination between the transmission plug and the adapter plug is achieved. It also enables the first plug to perform the connection ability after the second plug penetrates through the fitting hole of smaller size.

(b) DESCRIPTION OF THE PRIOR ART

Optical fiber communication, which has been developed for a long time, belongs to one kind of wired communication using light and optical fiber to transmit information. The optical fiber communication system has essentially revolutionized the telecommunications industry, and it plays a very important role in the digital era at the same time.

The main reason is that the optical fiber communication has multiple advantages including large transmission capacity, confidentiality, etc.

However, the conventional optical fiber transmission line is mainly made of silica glass, which will lead to a danger of breaking off when being bent too drastically and resulting in an increase in the using cost.

As a result, the industry has developed one kind of fiber optical transmission cable with a plug to directly convert the fiber optical signals into the digital or analog signals.

And, along with the light, thin, short, and small trend of the portable electronic devices, the occupied volume of the electrical connectors for them must also be reduced. So that the electrical connector jack on the portable electronic device tends to be a miniaturized electrical connector jack, and the matching transmission line plug is also bound to be a miniaturized transmission line plug.

However, the electrical connector jacks of the household type electronic devices are still the non-miniaturized electrical connector jacks, which will result in that the user must prepare the transmission line with a plug having a variety of different size to accommodate the different size of the electrical connector jack.

Therefore, the industry has developed a signal adapter that can convert the small-sized plug (e.g., Micro HDMI) of the fiber optic transmission cable into a large-sized plug (e.g., HDMI).

However, in order to ensure the stability of the connection with the transmission line, the conventional signal adapter mainly uses a screw locking method to lock the plug of the transmission line and the signal adapter. As a result, it will make the transmission line plug need preset a locking hole. However, if the space for the locking hole is added in a small volume plug, it is bound to affect the difficulty of designing the internal electric circuit of the plug. In addition, because the optical fiber transmission cable has the advantages of large transmission capacity and may have a long transmission distance due to environmental requirements, it is necessary to have precise and stable electrical connections so as not to affect the transmission quality. When being applied to the long-distance transmission, the weight of the optical fiber transmission cable and the transmission connection plug are also inevitably increased in addition to increasing the length of the optical fiber transmission cable. If only depending on a single screw locking method to fix the optical fiber transmission cable, the optical fiber transmission cable and the signal adapter will be easily shaken and pulled, which will inevitably affect the transmission quality of the optical fiber transmission cable.

SUMMARY OF THE INVENTION

The present invention discloses a connector fixing structure, which comprises a transmission plug and an adapter plug. The transmission plug has a transmission line set at one end thereof, a first plug set at the other end thereof, at least one first magnetic element set at the periphery of the first plug, a guide slot set at least one side thereof, and a positioning groove set on the bottom surface thereof. The adapter plug is used to combine with the transmission plug. A second plug is set at one end of the adapter plug and a connection section is recessedly set at the other end. The sizes of the first plug (e.g. Micro HDMI) and the second plug (e.g. HDMI) are different; And, the adapter plug has a signal jack, at least one second magnetic element, a protruding block, and a resilient piece respectively set at the positions of the connection section; wherein the signal jack and the first plug are mutually corresponded and insertedly connected electrically; wherein the second magnetic element and the first magnetic element are mutually corresponded and adsorbed each other; wherein the protruding block and the guide slot are mutually corresponded and combined with each other; wherein the resilient piece and the positioning groove are mutually corresponded and engagedly set with each other.

The technical features of the present invention are lied in that: the transmission plug is respectively set with the first magnetic element, the guide slot, and the positioning groove; and the adapter plug is respectively set with the signal jack, the second magnetic element, the protruding block, and the resilient piece at the positions of the connection section. When the transmission plug and the adapter plug are combined, the first plug set in the transmission plug and the signal jack of the adapter plug can be mutually insertedly and electrically connected. And, the first magnetic element and the second magnetic element can be mutually adsorbed, the protruding block can be combined with the guide slot, and the positioning groove can be mutually engaged with the resilient piece. Such that, the multi-point stable combination between the transmission plug and the adapter plug is achieved. It also enables the first plug of the transmission plug to perform the connection ability after the second plug penetrates through the fitting holes of different sizes.

DETAILED DESCRIPTION OF THE PREFERRED EMBODIMENTS

The following descriptions are exemplary embodiments only, and are not intended to limit the scope, applicability or configuration of the invention in any way. Rather, the following detailed description provides a convenient illustration for implementing exemplary embodiments of the invention. Various changes to the described embodiments may be made in the function and arrangement of the elements described without departing from the scope of the invention as set forth in the appended claims.

The foregoing and other aspects, features, and utilities of the present invention will be best understood from the following detailed description of the preferred embodiments when read in conjunction with the accompanying drawings.

Please refer to FIG. 1 to FIG. 6, the present invention discloses a connector fixing structure, which comprises a transmission plug 1 and an adapter plug 2.

Figure 1:
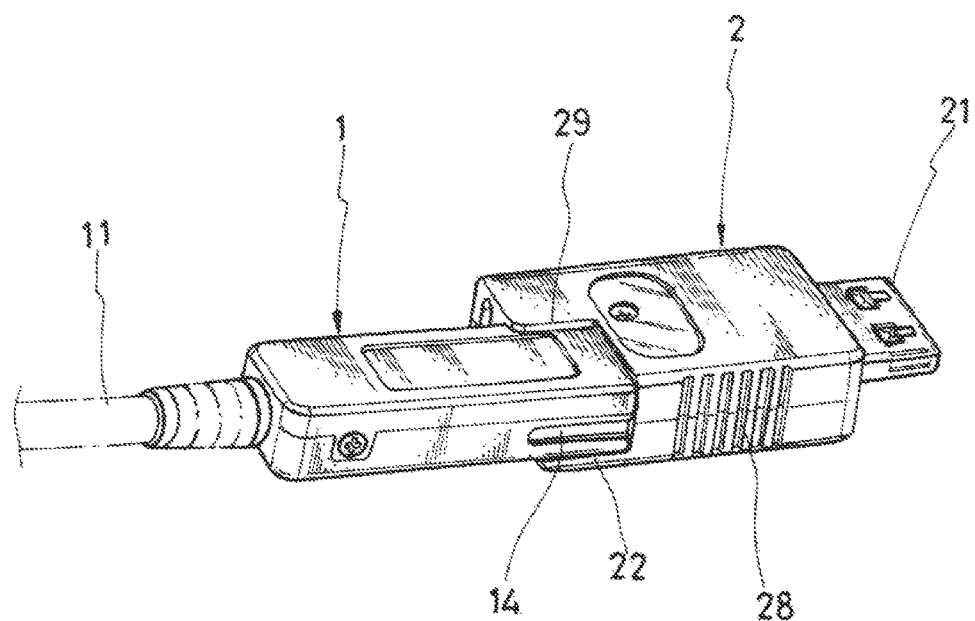
FIG. 1 is a three-dimensional assemble diagram of the connector fixing structure according to the present invention.
Figure 2:
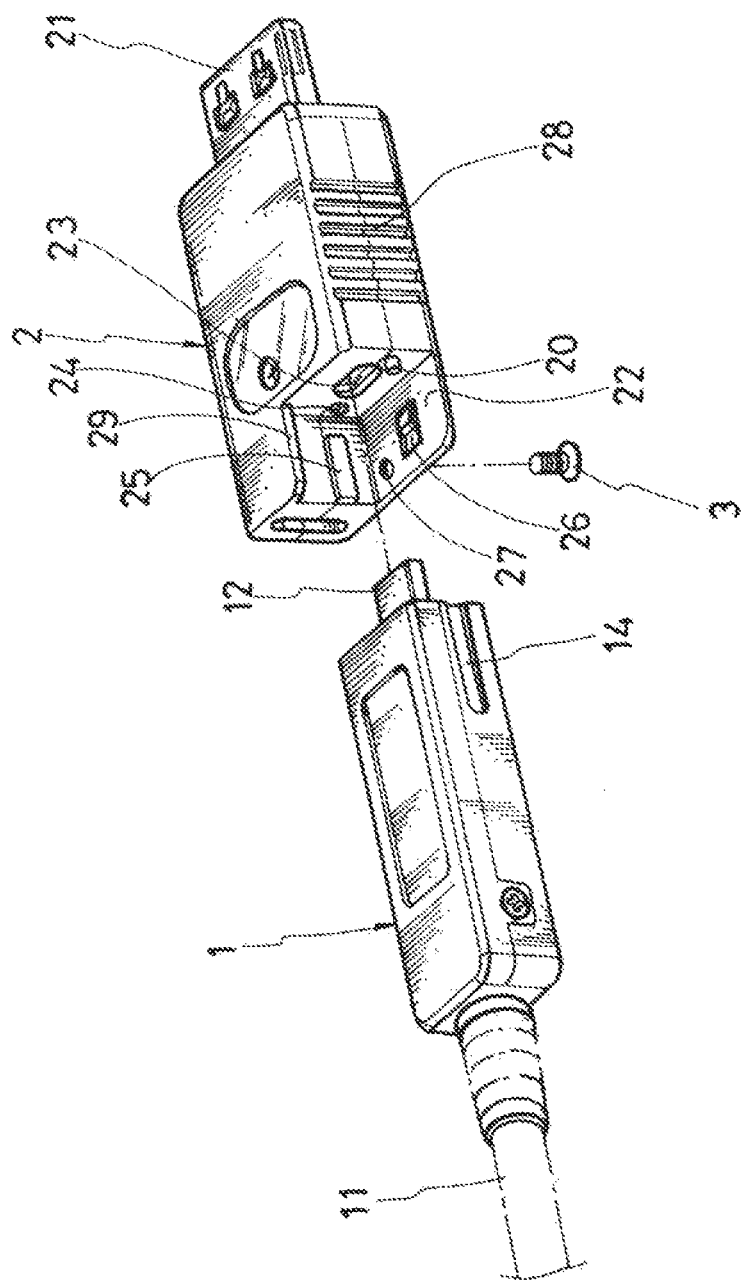
FIG. 2 is a decomposition diagram of the connector fixing structure according to the present invention.
Figure 3:
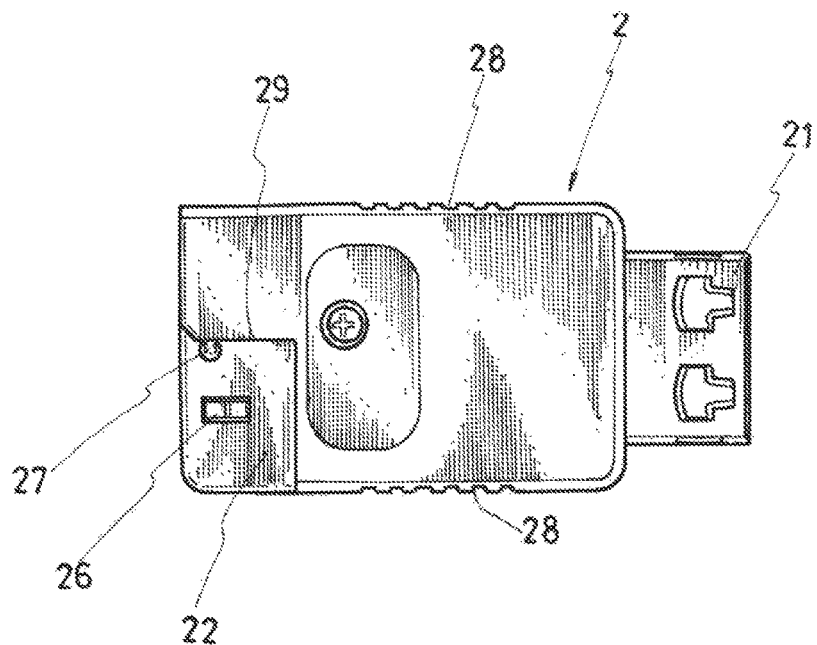
FIG. 3 is a top plan view of the adapter plug of the connector fixing structure according to the present invention.
Figure 4:
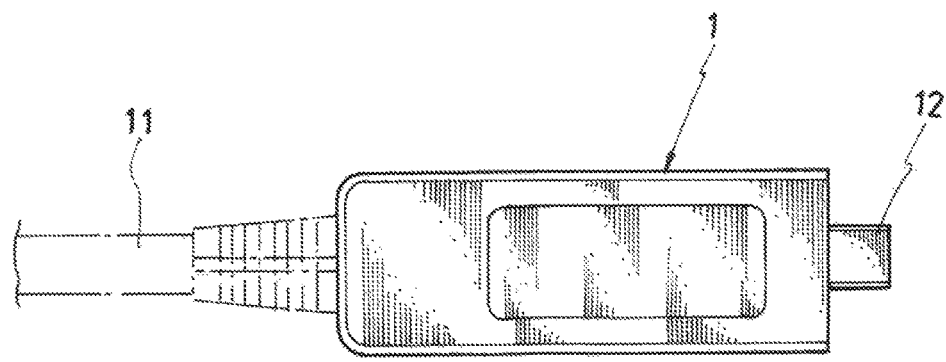
FIG. 4 is a top plan view of the transmission plug of the connector fixing structure according to the present invention.
Figure 5:
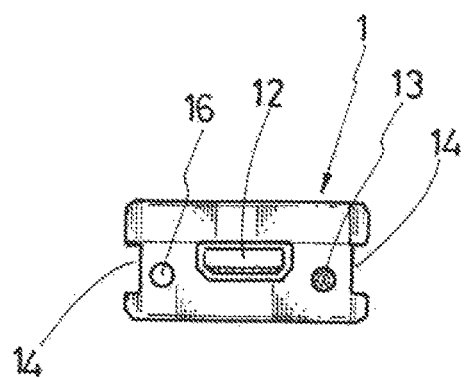
FIG. 5 is a front side view of the transmission plug of the connector fixing structure according to the present invention.
Figure 6:
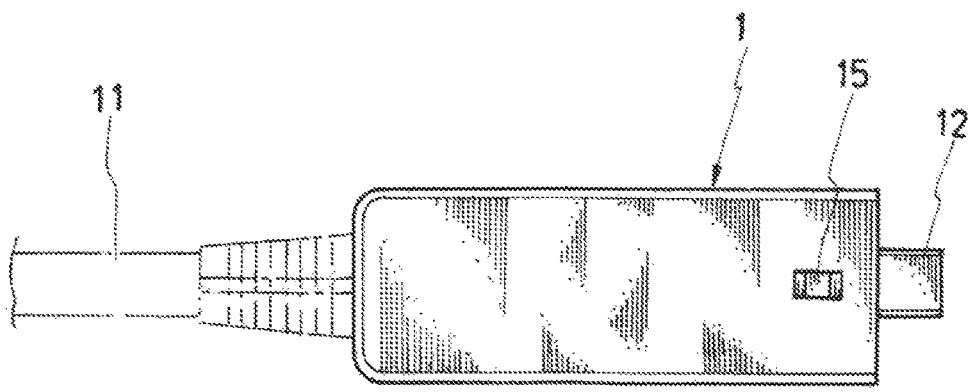
FIG. 6 is a bottom plan view of the transmission plug of the connector fixing structure according to the present invention.

The transmission plug 1 has a transmission line 11 set at one end thereof, a first plug 12 set at the other end thereof, and at least one first magnetic element 13 set at the periphery of the first plug 12 as shown in FIG. 5. And, the transmission plug 1 has a guide slot 14 set at least one side thereof and a positioning groove 15 set on the bottom surface thereof; wherein the guide slot 14 and the positioning groove 15 are adjacent to the first plug 12. And, the transmission plug 1 has at least one positioning hole 16 set at the periphery of the first plug 12 thereof. The first plug 12 can be a Micro HDMI plug or a plug with other Micro specification.

The adapter plug 2 is used to combine with the transmission plug 1. A second plug 21 is set at one end of the adapter plug 2 and a connection section 22 is recessedly set at the other end. The adapter plug 2 has a signal jack 23, at least one second magnetic element 24, a protruding block 25, and a resilient piece 26 respectively set at the positions of the connection section 22; wherein the signal jack 23 and the first plug 12 are mutually corresponded and insertedly connected electrically. The second magnetic element 24 and the first magnetic element 13 are mutually corresponded and adsorbed each other. The protruding block 25 and the guide slot 14 are mutually corresponded and combined with each other. The resilient piece 26 and the positioning groove 15 are mutually corresponded and engagedly set with each other. The resilient piece 26 is bent toward the positioning groove 15 to form a bending section, so that the resilient piece 26 can be engaged and positioned in the positioning groove 15. The adapter plug 2 has at least one positioning pin 20 set at the position of the connection section 22; wherein the positioning pin 20 and the positioning hole 16 of the transmission plug 1 are mutually corresponded and engaged.

The second plug 21 can be a Micro HDMI plug or a plug with other non-Micro specification. The second plug 21 can be an HDMI plug or other plug, so that the first plug 12 and the second plug 21 can have different sizes.

One characteristic of the present invention is that: the transmission plug 1 is respectively set with the first plug 12, the first magnetic element 13, the guide slot 14, and the positioning groove 15; and the adapter plug 2 are respectively set with the signal jack 23, the second magnetic element 24, the protruding block 25, and the resilient piece 26 at the positions of the connection section 22. When the transmission plug 1 and the adapter plug 2 are combined, the first plug 12 set in the transmission plug 1 and the signal jack 23 of the adapter plug 2 can be mutually insertedly and electrically connected to make the first plug 12 and the second plug 21 electrically connected. And, the first magnetic element 13 and the second magnetic element 24 can be mutually adsorbed, the protruding block 25 can be combined with the guide slot 14, and the positioning groove 15 can be mutually engaged with the resilient piece 26. Then, the positioning hole 16 and the positioning pin 20 can be engaged with each other to achieve the effect that the transmission plug 1 and the adapter plug 2 have the multi-point stable combination.

Therefore, the transmission line 11 of the transmission plug 1 may be an optical fiber signal transmission line, so that the optical fiber signal can be transmitted stably through the comprehensive and stable multi-point connection ability.

At the same time, the first plug 12 of the transmission plug 1 can be connected to the jacks of different sizes through the second plug 21 of the adapter plug 2.

In addition, the adapter plug 2 can further set at least one locking hole 27 on the bottom surface of the connection section 22 to mutually locked with a preset locking element 3.

When the transmission plug 1 and the adapter plug 2 are combined, the locking element 3 can further penetrates the locking hole 27 to presses the bottom of the transmission plug 1 tightly, so the further stable connection of the transmission plug 1 and the adapter plug 2 is achieved.

Furthermore, the adapter plug 2 may be thither set with an anti-skid section 28 on its side to increase the holding friction of the side of the adapter plug 2, wherein the anti-skid section 28 may be a groove or a convex portion arranged in intervals.

Furthermore, the adapter plug 2 can further extendingly set a baffle plate 29 on the top of the connection section 22. When the transmission plug 1 is in the position of the connection section 22, the transmission plug 1 can be baffled by the baffle plate 29 and the bottom surface of the connection section 22 to further achieve the stable connection of the transmission plug 1 and the adapter plug 2. In addition, the baffle of the baffle plate 29 can be used to cancel the induced reaction stress when the locking element 3 is forced against the bottom of the transmission plug 1, and so as to ensure that the first plug 12 of the transmission plug 1 can be firmly inserted into the signal jack 23 of the adaptor plug 2.

We claim:
1. An adaptor configured to connect with a connector, comprising:
   a housing having a first surface, a second surface neighboring the first surface, a third surface neighboring the second surface and a fourth surface neighboring the third surface, wherein the third surface is parallel with and recessed from the first surface, and the second surface is parallel with and recessed from the fourth surface;

a signal jack at the second surface of the housing, wherein the signal jack is configured to receive a first plug of the connector; and a second plug on the housing, wherein the second plug has a width at a distal end thereof configured to be greater than that of the first plug at a distal end thereof;

wherein the housing comprises a board extending perpendicularly from an edge of the second surface and from a first edge of the third surface to baffle the connector.

2. The adaptor of claim 1, wherein the housing has an anti-skid section on the first surface thereof, wherein multiple grooves in intervals are at the first surface for the anti-skid section.

3. The adaptor of claim 1, wherein the housing has an anti-skid section on the first surface thereof, wherein the housing has multiple convex portions in intervals at the first surface for the anti-skid section.

4. The adaptor of claim 1, wherein the housing comprises a baffle plate extending perpendicularly from the third surface to baffle the connector.

5. The adaptor of claim 1, wherein the first plug is Micro HDMI specification and the second plug is HDMI specification.

6. The adaptor of claim 1, wherein the housing comprises a positioning pin at the second surface thereof to insert into a positioning hole in the connector.

7. The adaptor of claim 1, wherein the housing comprises a magnetic element at the second surface thereof to absorb a magnetic element of the connector.

8. The adaptor of claim 1, wherein the housing comprises a resilient piece on the board to engage with a positioning groove in the connector.

9. The adaptor of claim 1 further comprising a locking element configured to penetrate through a locking hole in the board to engage with the connector.

10. The adaptor of claim 1, wherein the housing further comprises a baffle plate extending perpendicularly from a second edge of the third surface opposite to the first edge of the third surface to baffle the connector with the board.

11. The adaptor of claim 1, wherein the housing comprises a protruding block at the third surface to engage with a guide slot in the connector.

12. An adaptor configured to connect with a connector, comprising:

a housing configured to receive the connector from a corner thereof, wherein an open space recessed from the corner of the housing is configured to accommodate a portion of the connector;

a signal jack on the housing, wherein the signal jack faces the open space, wherein the signal jack is configured to receive a first plug of the connector; and a second plug on the housing, wherein the second plug has a width at a distal end thereof configured to be greater than that of the first plug at a distal end thereof;

wherein the housing comprises a baffle plate and board respectively at two opposite sides of the open space to baffle the connector;

wherein the housing comprises a resilient piece on the board to engage with a positioning groove in the connector.

13. The adaptor of claim 12, wherein the housing has an anti-skid section on a surface thereof, wherein multiple grooves in intervals are at the surface for the anti-skid section.

14. The adaptor of claim 12, wherein the housing comprises a baffle plate overhanging the open space to baffle the connector.

15. The adaptor of claim 12, wherein the first plug is Micro HDMI specification and the second plug is HDMI specification.

16. The adaptor of claim 12, wherein the housing comprises a positioning pin at a surface thereof facing the open space to insert into a positioning hole in the connector.

17. The adaptor of claim 12, wherein the housing comprises a magnetic element at a surface thereof facing the open space to absorb a magnetic element of the connector.

* * * * *